March 12, 1968 C. H. ADAMS 3,373,250

HAND HELD MULTI-CHANNEL MAGNETIC TAPE ERASER

Filed April 6, 1964

INVENTOR.
Clarence H. Adams
BY
Fishburn & Gold
ATTORNEYS

United States Patent Office 3,373,250

Patented Mar. 12, 1968

3,373,250

HAND HELD MULTI-CHANNEL MAGNETIC TAPE ERASER

Clarence H. Adams, 601 E. Armour, Kansas City, Mo. 64109

Filed Apr. 6, 1964, Ser. No. 357,669

7 Claims. (Cl. 179—100.2)

ABSTRACT OF THE DISCLOSURE

A hand held multi-channel magnetic tape eraser includes a plurality of magnetic field producing members which may be selectively stacked so as to correspond to respective channels on the tape, the members being individually rotatable for deactivation or replaceable with a non-magnetic member for selecting the channels to be erased.

This invention relates to magnetic recording tape erasers, and more particularly to such devices adapted for use with multiple channel tape.

The principal objects of the present invention are: to provide a magnetic tape eraser which may be conveniently held in the hand for engaging and erasing exposed magnetic tape during travel through any common tape-handling mechanism such as a conventional tape recorder; to provide such a device which may be easily and quickly adjusted for selectively erasing any desired combination of channels or tracks on a multiple channel magnetic tape without disturbing any remaining channels; to provide such a device which may be used for selectively erasing magnetic tape regardless of the direction or rate of speed of which the tape is traveling; and to provide such a device which is simple in construction, economical and inexpensive to manufacture and rugged and reliable in use.

Other objects and advantages of this invention will become apparent from the following description taken in connection with the accompanying drawings wherein are set forth by way of illustration and example certain embodiments of this invention.

Figures 1, 2, 3, 4, 5:
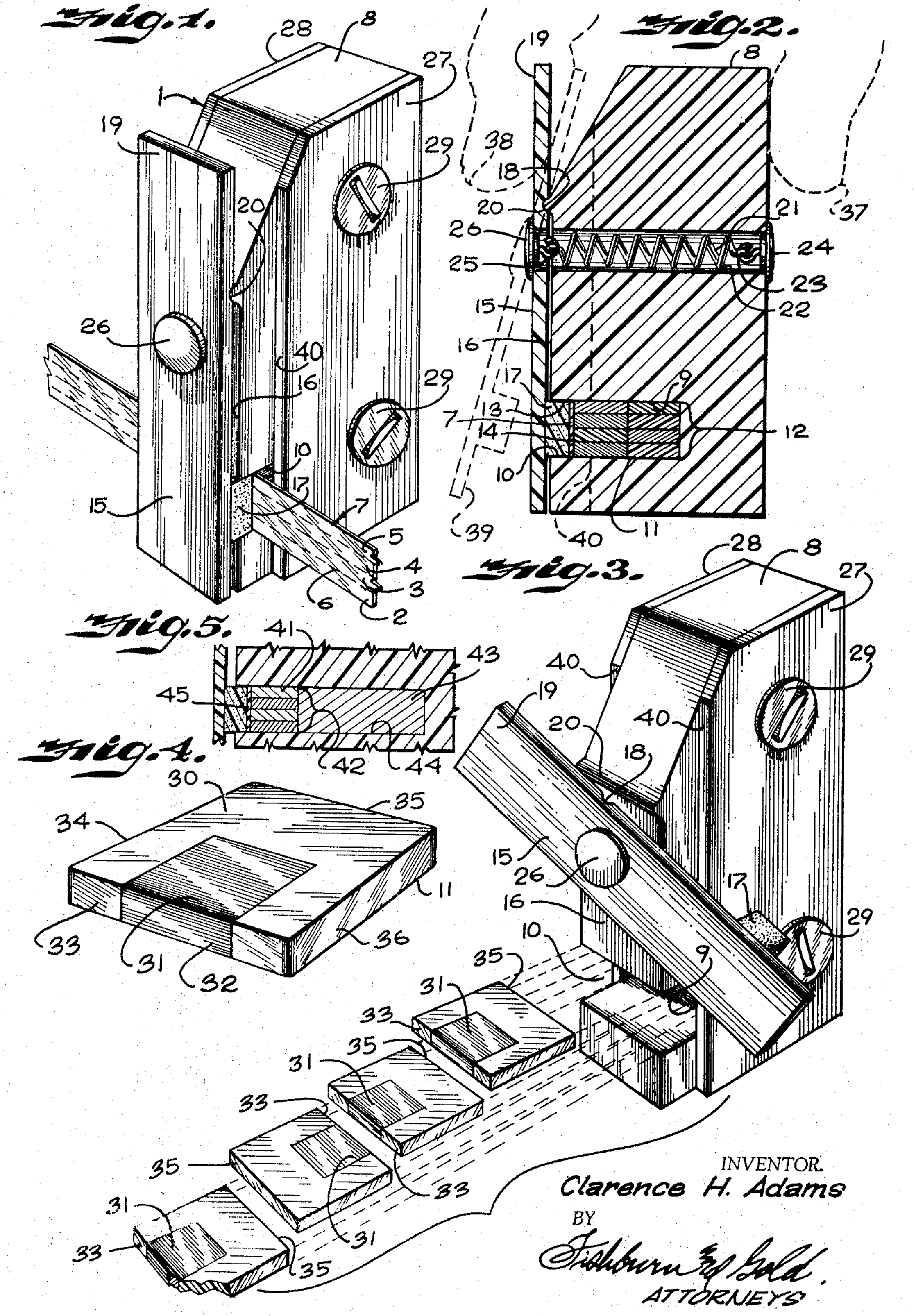
FIG. 1 is a perspective view of a magnetic tape eraser embodying this invention and showing a length of magnetic tape in erasing position extending therethrough.
FIG. 2 is a vertical cross-sectional side view of the eraser with a moveable tape-engaging pad supporting member shown by broken lines in tape-disengaging position.
FIG. 3 is an exploded perspective view of the eraser showing a pivotal displacement of the pad supporting member and four magnetic field directing or producing members receivable in selective positions into a tape-receiving slot.
FIG. 4 is a perspective view on an enlarged scale showing a magnetic field directing or producing member with a magnetic slug therein having the proper height for erasing a single channel on the tape.
FIG. 5 is a fragmentary vertical cross-sectional view illustrating a modified form of eraser wherein a magnet is positioned behind either magnetic or non-magnetic field directing members for erasing desired channels on a multiple channel tape.

Referring to the drawings in more detail:

The reference numeral 1 generally indicates a multi-channel magnetic tape eraser which may be held in the hand during use and which is adapted to selectively erase any desired combination of recording tracks on channels thereon and designated by the numerals 2, 3, 4, and 5, said channels being between the broken lines 6, FIG. 1, on a length of magnetic tape 7 traveling therethrough. The eraser 1 includes a body 8 of non-magnetic material such as plastic resin and having a notch or slot 9 extending thereinto. The slot 9 has a height substantially equal to the height of the magnetic tape 7 and is open at the forward end 10 thereof for receiving the tape.

A plurality of magnetic field directing or producing members 11, in the illustrated example, are of rectangular plate-like configuration and each has a vertical dimension or height (thickness) substantially equal to the height (width) of one of the channels 2, 3, 4 and 5. Thus a number of members 11 equal to the number of channels on the tape will vertically fill the slot 9 when they are placed in a stack 12 as best illustrated in FIG. 2. The members 11 are preferably identical in shape to each other and have a depth less than the depth of the slot 9 whereby when the stack 12 is inserted into the slot, a tape receiving recess 13 is formed at the slot forward end 10. The stack 12 produces a tape-contacting abutment 14 located within the slot 9.

An elongated plate or supporting member 15 extends longitudinally along the front 16 of the body 8 and has a resilient pad 17 secured thereto. The pad 17 has a height substantially equal to the height of the slot and an uncompressed thickness greater than the recess depth of the tape-contacting abutment 14 so that the pad 17 will be compressed against the tape before the supporting member 15 contacts the front 16 of the body at the lower portion thereof. The supporting member 15 has a groove 18 extending transversely thereacross intermediate the upper end 19 thereof and the pad 17. The groove 18 is adapted to receive an elongated bead or protrusion 20, extending transversely across the front of the body 8 for pivotally mounting the supporting member 15 on the body with the pad 17 aligned to be received in slot open end 10. A resilient tension spring 21 is contained within a bore 22 extending generally normally to the supporting member 15 through the body 8. One end 23 of the spring 21 is anchored against the body 8 by means of a button member 24 and the other end 25 of the spring 21 is anchored with respect to the supporting member 15 by means of a button member 26 located between the groove 18 and the pad 17 whereby the spring 21 normally urges the pad 17 into the slot 9. When the tape 7 is located in the slot the tension of the spring 21 results in the pad being pressed against the tape which is in turn pressed against the abutment 14.

The magnetic field directing or producing members 11 have a width or transverse size slightly greater than the transverse size of the body 8 whereby the side edges thereof extend slightly beyond the opposite sides of the slot 9 when they are stacked therewithin. Plate members 27 and 28 are removably secured on opposite sides of the body 8 by suitable screws 29 which threadedly engage the body 8 on opposite sides thereof. When the screws 29 are tightened, the plates 27 and 28 clamp the magnetic field directing members 11 in the slot 9 and prevent accidental disengagement thereof. However, by rotating the supporting member 15 so that the pad 17 is removed from the vicinity of the open end 10 of the slot 9 and loosening the screws 29, the members 11 may be easily withdrawn, rotated and reinserted (FIG. 3) for reasons appearing below.

Referring particularly to FIG. 4, a field directing or producing member 11 includes a matrix or support portion 30 of non-magnetic material such as a suitable plastic resin and a magnetic slug portion 31 having a relatively high magnetic field density. The slug portion 31 is supported so that a peripheral edge 32 thereof forms a portion of one edge 33 of the member 11 while the remaining edges 34, 35 and 36 of the member 11 consist only of non-magnetic material.

By way of operation, the four field directing members 11 are stacked one upon the other for insertion into the slot 9. The respective members 11 are respectively rotated prior to insertion so that the edge 32 thereof will face the open end 10 of the slot 9 only where a channel of the tape 7 is to be erased. Then, upon insertion of the tape and drawing same through the slot as illustrated in FIG. 1, only the desired channel will be erased. As illustrated in FIG. 3, channels 2, 4 and 5 will be erased and channel 3 will be unaffected. When the stack is formed as desired and inserted into the slot 9, the screws 29 are tightened to secure the stack in position and the supporting member 15 is rotated back so that the pad 17 is urged into the slot 9. The tape 7 may then be easily loaded or trapped in the slot 9 adjacent the forward end 10 thereof by merely pressing the upper portion 19 thereof rearwardly of the body 8 by means of squeezing the assembly between the thumb 37 and finger 38. This withdraws the pad 17 from the open end 10, as best illustrated in broken lines at 39, whereby the tape is easily inserted. The upper portion 19 is then released trapping the tape within the slot against the abutment 14. The forward edges 40 of the plate members 27 and 28 are located slightly rearwardly of the abutment 14 so as to clamp the respective members 11 but not interfere with the movement of the tape 7 transversely through the device. When the desired length of tape has been erased, it is easily disengaged by again pressing on the upper portion 19. The procedure as described eliminates the need for disturbing the threading of the recorder or other mechanism handling the tape.

Referring to FIG. 5, an additional embodiment of this invention is illustrated which is similar to that described above except that the members 41 making up the stack 42 are either formed of magnetic field directing material such as soft iron or a non-magnetizable material such as brass. A suitable magnet 43 which is preferably the same height as the slot 44 is received thereinto behind the members 41. Erasing occurs where the soft iron member is used, but where the brass member is used the field becomes isolated from the respective channel in the tape 45 and no erasing results. It is to be understood that by varying the various members in the stack 42, any desired erasing pattern may be built up.

It is to be understood that while certain forms of this invention have been illustrated and described, it is not to be limited to the specific form or arrangement of parts herein described and shown except insofar as such limitations are included in the claims.

What I claim and desire to secure by Letters Patent is:

1. A hand held multi-channel magnetic tape eraser adapted to selectively erase a desired combination of channels on multi-channel magnetic tape comprising:

(a) a body of non-magnetic material having means forming a slot extending thereinto for slidably receiving the tape, said slot having a height substantially equal to the height of the tape, (b) a plurality of magnetic field producing members and non-magnetic members being equal in number to the number of channels on said sape, said members being individually removably received in said slot in selectively stacked positions corresponding to the elevations of the respective channels, said members forming a tape-contacting abutment recessed within said slot, and (c) means coperating with said body for slidably urging said tape against said abutment, (d) whereby said abutment produces a magnetic erasing field on only selected channels on said tape.

2. The eraser as set forth in claim 1 wherein:

(a) said field producing members and non-magnetic members are the same members, (b) said members being comprised of magnetic and non-magnetic portions.

3. The eraser as set forth in claim 1 wherein:

(a) said field producing members and non-magnetic members are the same members and each have peripheral edges and are each comprised of a non-magnetic support portion and a magnetic slug portion, (b) said mangetic slug portion being exposed on at least one of said edges and said non-magnetic support portion forming at least one of said edges, (c) said members being individually rotatable with respect to each other to expose a selected edge to said tape.

4. The eraser as set forth in claim 1 including:

(a) a magnet in said slot and located adjacent said members but spaced from said abutment, (b) said members being composed respectively of magnetic field transmitting material and non-magnetizable material for producing a desired erasing field pattern at said abutment.

5. The eraser as set forth in claim 1 wherein said means slidably urging said tape against said abutment comprises:

(a) a support having a resilient pad secured thereto with a height substantially equal to the height of said slot and an uncompressed thickness greater than the recess depth of said abutment in said slot, (b) means pivotally mounting said support on said body with said pad aligned with said slot for selective insertion of said pad thereinto and removal therefrom, and (c) resilient means engaging said body and said support for normally urging said pad into said slot and said tape against said abutment.

6. The eraser as set forth in claim 5 wherein:

(a) said means pivotally mounting said support on said body is universally pivotable whereby said support is rotatable with respect to said body for exposing said slot to conveniently remove and replace said members.

7. A hand held multi-channel magnetic tape eraser adapted to selectively erase any desired combination of channels on magnetic tape regardless of tape travel direction comprising:

(a) a body of non-magnetic material having means forming a slot extending thereinto, said slot having a height substantially equal to the height of the magnetic tape to be erased and being open at one end thereof, (b) a plurality of magnetic field producing plate members each having a high magnetic field density along one edge thereof and a low magnetic field density along another edge thereof, said members having a height substantially equal to the height of a single channel on said tape and being equal in number to the number of channels on said tape, said members being removably received in said slot in selectively stacked condition and each having an equal depth less than the depth of said slot whereby said stacked members recess behind said open end forming a tape-contacting abutment within said slot, (c) a support having a resilient pad secured thereto with a height substantially equal to the height of said slot and an uncompressed thickness greater than the recess depth of said abutment in said slot, means pivotally mounting said support on said body with said pad aligned with said slot open end for selective insertion of said pad thereinto and removal therefrom, and resilient means engaging said body and said support for normally urging said pad into said slot and said tape against said abutment, (d) said members being selectively rotatable with respect to each other to produce a desired field density pattern at said abutment.

References Cited

UNITED STATES PATENTS

| | | | |
|---|---|---|---|
| 2,594,934 | 4/1952 | Kornei | 179—100.2 |
| 2,713,619 | 7/1955 | Eddy | 179—100.2 |
| 2,958,736 | 11/1960 | Akai | 179—100.2 |

FOREIGN PATENTS

| | | |
|---|---|---|
| 665,949 | 7/1963 | Canada. |

BERNARD KONICK, *Primary Examiner.*

R. SNIDER, A. I. NEUSTADT, *Assistant Examiners.*